UNITED STATES PATENT OFFICE.

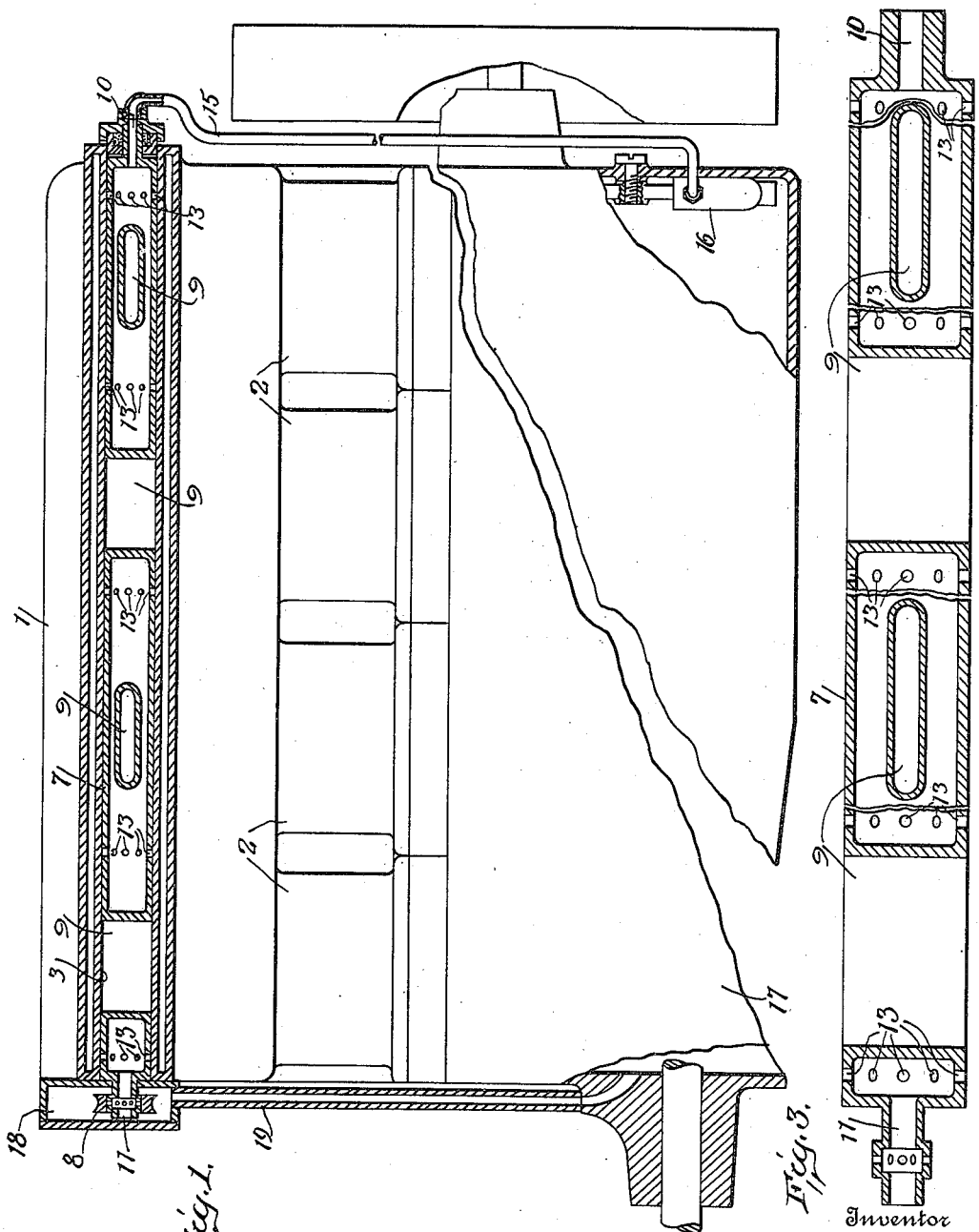

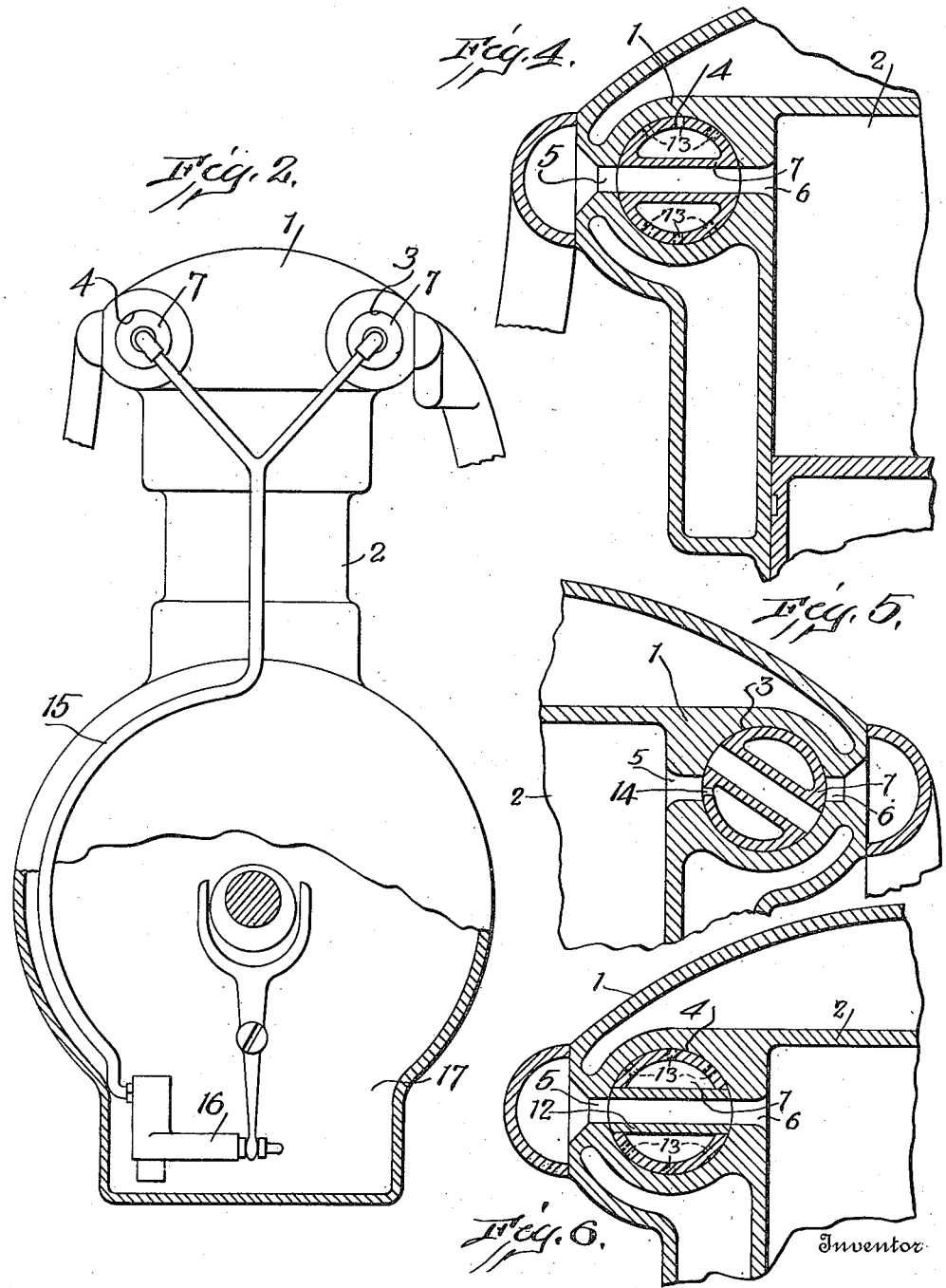

CYRUS E. MEAD, OF DAYTON, OHIO, ASSIGNOR TO THE MEAD ENGINE COMPANY, OF DAYTON, OHIO, A CORPORATION OF OHIO.

ROTARY VALVE FOR EXPLOSIVE-ENGINES.

1,134,693.  Specification of Letters Patent.  Patented Apr. 6, 1915.

Application filed October 6, 1911. Serial No. 653,099.

*To all whom it may concern:*

Be it known that I, CYRUS E. MEAD, a citizen of the United States, residing at Dayton, in the county of Montgomery and State of Ohio, have invented certain new and useful Improvements in Rotary Valves for Explosive-Engines, of which the following is a specification, reference being had therein to the accompanying drawing.

This invention relates to rotary valves for explosive engines and more particularly to means for lubricating valves of this character.

The object of the invention is to provide means for lubricating rotary valves which will be simple in construction and will have a high degree of efficiency.

To this end it is a further object of the invention to lubricate the valve from within by providing it with an internal oil conduit which communicates with a source of oil supply and with the bearing surface of the valve.

It is also an object of the invention to cause the oil to circulate through the conduit in such a manner that it will have a cooling effect upon the valve.

In the accompanying drawings, Figure 1 is an elevation, partly in section, of the upper portion of a gas engine embodying my invention; Fig. 2 is an end elevation, partly broken away, of the same; Fig. 3 is a longitudinal section of one of the valves; Fig. 4 is a transverse section taken through one of the valve chambers and the valve; Fig. 5 is a transverse section of the exhaust valve; and Fig. 6 is a transverse section of a slightly modified form of the valve.

In these drawings I have illustrated one embodiment of my invention and have shown the same as applied to a four cylinder gas engine of a known type. The engine, which is indicated as a whole by the reference numeral 1, has its four cylinders, 2, arranged vertically and is provided along each side thereof near the upper end of said cylinders with longitudinal bores 3 and 4, each of which constitutes a valve chamber. These bores or valve chambers are provided along each side with a series of ports 5 and 6. The ports 5, in the inner side of each valve chamber, place the same in communication with the several cylinders while the ports 6, along the outer side of each valve chamber, connect the same with the inlet and exhaust conduits, respectively. A cylindrical valve 7 is mounted in each valve chamber and has movement about a longitudinal axis. In the present instance the valves are rotated continuously in one direction by means of a gear 8 which is connected by a suitable train of gearing with the engine shaft, this connection not being here shown as it forms no part of the invention. Each valve has a series of through and through ports 9 adapted to register at intervals with the corresponding ports in the valve chamber and thus place the respective cylinders in communication with the inlet or exhaust conduits as the case may be.

The construction so far described is a known one and the present invention consists in providing means for lubricating the valves and for cooling the same. To accomplish this I provide each valve with an internal oil conduit formed in the body of the same and communicating with a suitable source of oil supply and also communicating by means of an opening or openings in the circumferential wall of the valve with the bearing surface of the valve. In the present construction the valve is hollow, comprising a cylindrical casing provided at one end with an inlet 10 and at the other end with an outlet 11. This casing has conduits extending transversely thereto to form the ports 9. In that construction shown in Figs. 1 to 5, inclusive, the conduits are cast integral with the cylindrical casing forming the body of the valve. While in that form shown in Fig. 6 the conduits are formed separate from the valve, as indicated at 12, and are rigidly secured at their opposite ends to the casing. This latter construction has the advantage of possessing a higher coefficient of expansion. The body portion or cylindrical casing of the valve has formed therein a series of openings placing the interior of the valve in communication with the bearing surface thereof. As here shown the valve members have bearing in the valve chamber throughout their entire length and the valve is provided with a series of openings in each of the spaces between the adjacent ports, as indicated at 13. The number and arrangement of these ports is, of course, optional and may be determined according to the requirement of each valve. It will be apparent that so long as the hollow valve contains oil this oil will pass in small quantities through the openings 13 to the bearing surfaces of the valve and the valve chamber, thus effectually lubricating the valve. In the case of the exhaust valve an opening may be formed in the body portion thereof immediately in the rear of each end of the port 9, as indicated at 14 in Fig. 5. The arrangement of this opening is such that it will register with the port 5 of the exhaust valve chamber during the suction stroke of the piston in the respective cylinder, thus subjecting the interior of the valve to the suction of the engine and causing the oil to be drawn through the opening. The outer end of the opening is preferably slightly flared and the oil, which will pass through the opening in small quantities, will adhere to the edges of the opening and thus be applied to the wall of the valve chamber.

In addition to its function of lubricating the valve the oil may also be utilized as a cooling medium for the valve, and, to this end, I have provided means for causing positive circulation of the oil through the valves. For this purpose I have connected the inlet openings of the valves by means of a pipe 15 with a pump 16 mounted in the crank casing 17, and actuated from the crank shaft in any suitable manner. The bottom of the crank case constitutes the oil receptacle and the pump 16 communicates with this receptacle and pumps the oil from the same into the valves. The outlets for the valves are connected with the crank casing so that the oil will return to the receptacle. As here shown the outlet of each valve discharges into a gear casing 18 which is connected by means of a pipe 19 with the crank casing 17.

The operation of the valve will be readily understood from the foregoing description and it will be apparent that I have not only provided an efficient and very simple lubricating device but that I have also so constructed this lubricating device that the oil serves as a cooling medium for the valve; and further, it will be apparent that the coring out of the valve has the additional advantage of materially reducing its weight.

While I have herein shown and described one embodiment of the invention it will be understood that this form is chosen for the purpose of illustration only and I do not desire to be limited to the details of construction shown and described, for obvious modifications will occur to a person skilled in the art.

Having thus fully described my invention, what I claim as new and desire to secure by Letters Patent, is:—

1. In an engine having a cylindrical valve chamber extending lengthwise thereof and having ports, of a valve rotatably mounted in said cylindrical valve chamber, having a longitudinal conduit and also having a transverse conduit extending through the longitudinal conduit and forming a through and through port to register with the ports of said valve chamber, said valve also having openings connecting said longitudinal conduit with the exterior bearing surface of said valve, and means to deliver oil to the interior of said valve.

2. In an engine having a cylindrical valve chamber extending lengthwise thereof and having ports, of a valve rotatably mounted in said cylindrical valve chamber, having a longitudinal conduit and also having a transverse conduit extending through the longitudinal conduit and forming a through and through port to register with the ports of said valve chamber, said valve also having openings connecting said longitudinal conduit with the exterior bearing surface of said valve, said engine also comprising a crank casing having an oil reservoir, a pump communicating with said oil reservoir, a conduit leading from said pump to one end of the longitudinal conduit of said valve, and a second conduit leading from the other end of said longitudinal conduit to said oil reservoir, whereby a circulation of oil will be maintained through said valve.

3. In an engine having a cylindrical valve chamber extending lengthwise thereof and having ports, of a valve rotatably mounted in said cylindrical valve chamber, having a longitudinal conduit and also having a transverse conduit extending through the longitudinal conduit and forming a through and through port to register with the ports of said valve chamber, said valve also having openings connecting said longitudinal conduit with the exterior bearing surface of said valve, said valve also having an opening communicating with said longitudinal conduit and arranged to register with the port of said valve chamber when said through and through port is out of register therewith, and means to deliver oil to the interior of said valve.

4. In an engine having a cylindrical valve chamber provided with ports, a hollow valve communcating with a source of oil supply and having openings connecting the interior thereof with the cylindrical bearing surface thereof, said valve also comprising transverse conduits extending through the hollow portion thereof and formed separately from and rigidly mounted in the cylindrical walls thereof to form a through-and-through port.

5. In an engine having a cylindrical valve chamber provided with a port, a valve rotatably mounted in said valve chamber having a port to register with the port of said chamber and also having an opening arranged to register with the port of said chamber when the valve port is out of alinement therewith.

6. In an explosive engine, the combination, with a cylinder having a valve chamber, and a port connecting said cylinder with said valve chamber, of a hollow rotary exhaust valve communicating with a source of oil supply, having a port adapted to register with the first-mentioned port and also having an opening through the circumferential wall thereof, said opening being arranged to register with the first-mentioned port when the valve port is out of alinement therewith and to subject the interior of said valve to the suction within said cylinder.

In testimony whereof, I affix my signature in presence of two witnesses.

CYRUS E. MEAD.

Witnesses:
L. W. JAMES,
HARRIET L. HAMMAKER.